Dec. 31, 1929.  C. R. PHILLIPS  1,741,433
DIRIGIBLE HEADLIGHT
Filed May 7, 1928  2 Sheets-Sheet 1
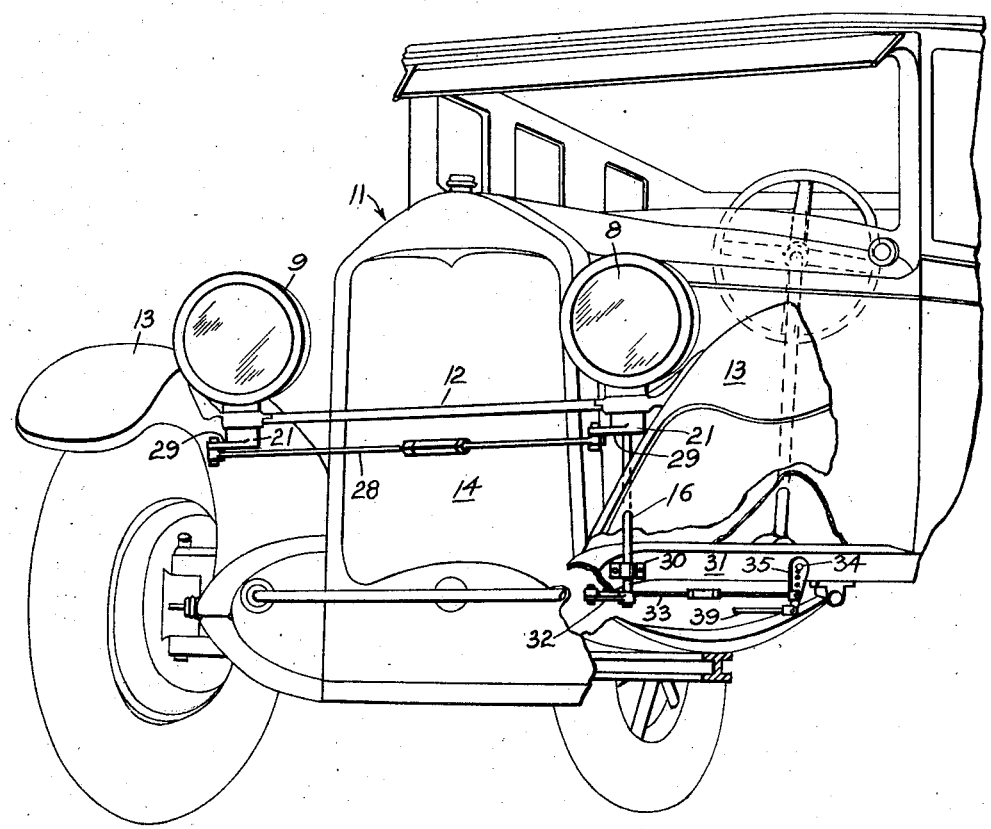
Fig. 1
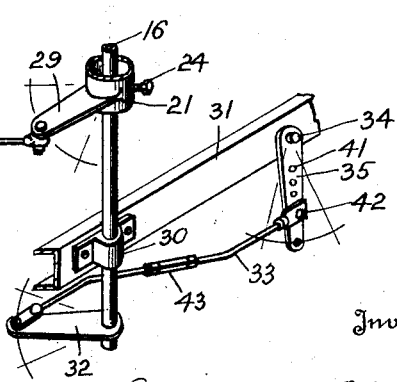
Fig. 2
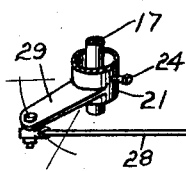
Fig. 3
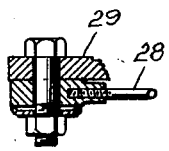
Inventor
Carlton R. Phillips
By M. C. Frank
Attorney Dec. 31, 1929.  C. R. PHILLIPS  1,741,433
DIRIGIBLE HEADLIGHT
Filed May 7, 1928  2 Sheets-Sheet 2

Inventor
Carlton R. Phillips
By M. C. Frank
Attorney

Patented Dec. 31, 1929

1,741,433

UNITED STATES PATENT OFFICE

CARLTON R. PHILLIPS, OF OAKLAND, CALIFORNIA

DIRIGIBLE HEADLIGHT

Application filed May 7, 1928. Serial No. 275,666.

The invention relates to dirigible headlights for vehicles and particularly to a mounting and control means therefor.

An object of the invention is to provide a new and improved mounting for a headlight arranged for rotation about a substantially vertical axis.

Another object of the invention is to provide a mounting of the character described in which shocks travelling through the vehicle frame and which might damage a lamp of a headlight are absorbed in the headlight mounting.

A further object of the invention is to provide a mounting of the class described in which the frictional resistance to the turning of a headlight is a minimum.

Still another object of the invention is to provide a control means for dirigible headlights using the aforesaid mounting whereby the headlights may be operated directly by the steering arm at the end of the steering post of a usual type of steering apparatus without involving an alteration or substitution of members in such apparatus.

The invention possesses other objects and features of advantage, some of which, with the foregoing, will be set forth in the following description of a preferred embodiment of the invention, and in the accompanying drawings, in which:

Figure 1 is a fragmentary perspective view of a motor vehicle having dirigible head lights mounted thereon in accordance with the present invention.

Figure 2 is a perspective view of an assembly of the essential elements of the control means for the head lights.

Figure 3 is an enlarged fragmentary sectional view of a portion of the control means.

Figure 4:
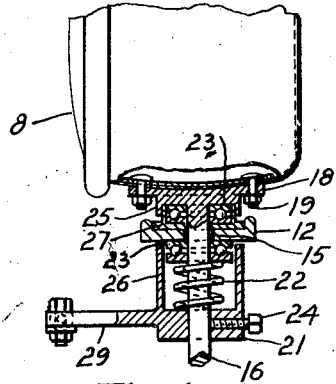
Figure 4 is an enlarged vertical sectional view of a headlight supporting portion of the device.
Figure 5:
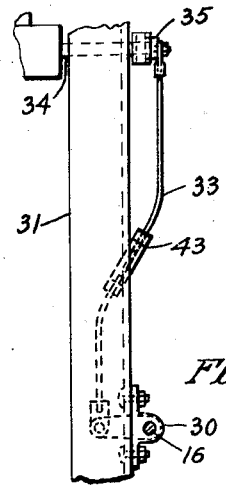
Figure 5 is a plan view of a portion of the control structure and a vehicle frame member supporting it.
Figure 6:
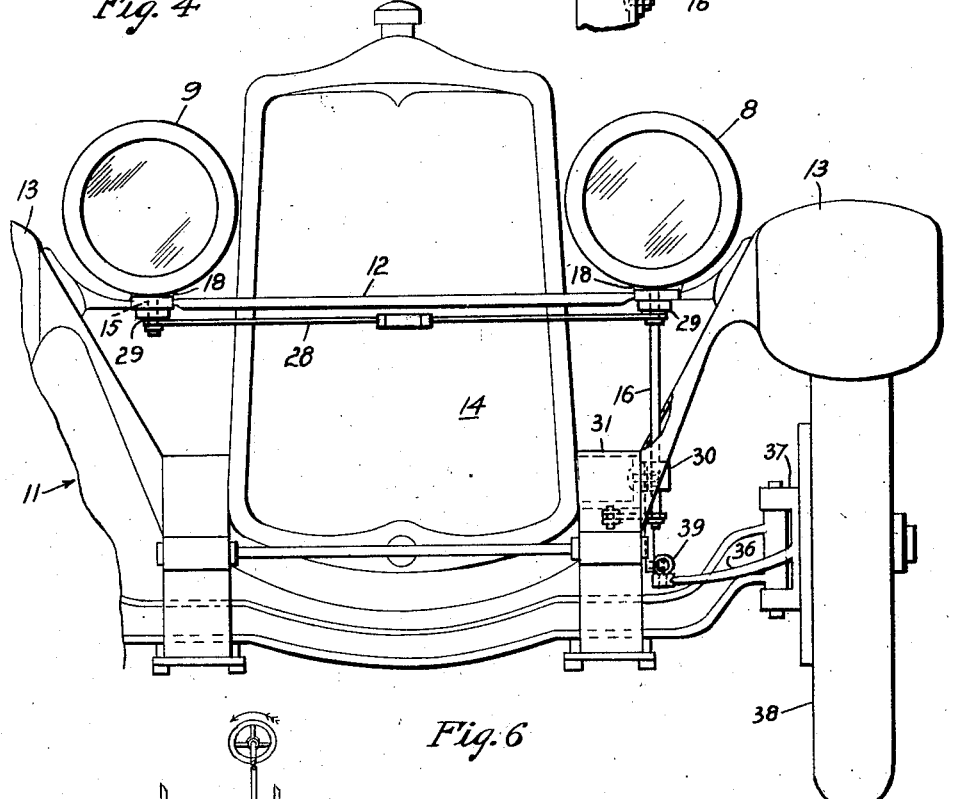
Figure 6 is a fragmentary front view of the vehicle shown in Figure 1.
Figure 7:
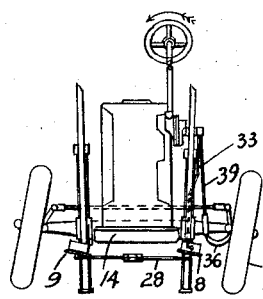
Figure 7 is a reduced and generally diagrammatic plan view showing the relation of my novel headlight mounting and control means to the steering apparatus of the vehicle.

As herewith particularly disclosed, the present invention is applied to effect the mounting and control of headlights 8 and 9 disposed generally at the front of a vehicle 11 at opposite sides thereof. The lights 8 and 9 are supported on a cross-bar 12 extending between the front fenders 13 of the vehicle forwardly of the radiator 14 thereof. The bar 12, it is noted, is vertically perforated adjacent the opposite ends thereof, as at 15, to receive lamp supporting spindles 16 and 17 which respectively carry the headlights 8 and 9 at the upper ends. Preferably, and as shown, the upper spindle end portions 18 are enlarged transversely of the spindle axes to provide suitably shaped seats for the lamps and the latter are secured thereto as by bolts 19.

Adjustably mounted on each of spindles 16 and 17 below the cross bar 12 is a collar 21, between which and the bar 12 is interposed a compression spring 22 whereby the spindle will be urged generally downwardly through the bar perforation 15. Preferably, and as shown in detail in Figure 4, anti-friction bearings 23 are operatively disposed between the bar 12 and each spindle head 18, and between the bar 12 and each collar 21, which latter is adjustably secured in place on its spindle by means of a set screw 24 whereby adjustment of the pressure at the bearings 23 may be effected. The resilient engagement of the bearings with the bar 12, it will be noted, provides a shock absorbing mounting for the headlights whereby jars are absorbed thereby and the headlights are protected from damage.

As herewith particularly shown, the bearings 23 each comprise a pair of opposed blocks encircling the spindle and having provided in the opposed faces thereof circular raceways for the reception of ball bearings, it being noted that those bearing blocks nearest the headlight supporting cross-bar 12 are desirably fixed against rotation. Preferably, and as shown, sleeve-like extensions 25 and 26 are provided at the spindle heads 18 and collars 21 respectively such sleeves generally enclosing the upper bearings 23 in the one case and the lower bearings 23 and the springs 22 in the other case, whereby the bearings and springs are concealed and are protected from dust. As shown, each upper bearing 23 is disposed in a cuplike member 27 interposed between it and the crossbar 12 and engaging the top face of the cross-bar.

When there are two headlights as in the present instance, it will usually be desirable to effect a similar and simultaneous turning thereof about their respective axis. Accordingly, and as shown, the headlights 8 and 9 are so connected as to be synchronously operable by means of a link 28 connecting between arms 29 extending radially from the collars 21, said arms being of like length extending forwardly in generally parallel relation when the steering gear is set for a straight-ahead movement of the vehicle. The link 28 is of adjustable length whereby the desired relation of the arms 29 may be effected, it being noted that slightly different angular movements of the two lamps will be effected if the effective link length differs from the distance between the spindle axis; if the link length is geater than said distance, the headlight on the side of the vehicle corresponding to the direction of turning will move through the greater angle, while if the link length is less than said distance, the same headlight would move through a lesser angle than the other.

The headlight supporting spindle at the driver's side of the vehicle is preferably connected to the steering gear for effecting a directing of the headlights in synchronism with the actuation of the steering gear. Accordingly, and as particularly shown, the spindle 16 is extended downwardly for journalled engagement through a bearing block 30 mounted on the outer side of a longitudinal frame member 31 of the vehicle and is provided at its lower end with a radially extending arm 32. A link 33 connects the free end of the arm 32 with the steering mechanism of the vehicle whereby a change in the direction of steering will effect a longitudinal displacement of the link 33 to rock the arm 32 and so angularly move the headlights in an appropriate direction and amount.

It will now be noted that the steering mechanism herewith particularly disclosed is a usual one and includes a shaft 34 journalled on the frame member 31 to extend horizontally and transversely outwardly therefrom, said shaft being connected to the steering wheel post by means of suitable gearing and carrying a radial arm 35 at the outer end thereof. As is usual, the arm 35 is connected to an arm 36 of the steering knuckle 37 of the adjacent front wheel 38 by means of a drag link 39.

It will now be noted that the link 33 is pivotally secured to the arm 35 of the shaft 34 for the purpose specified. Preferably, the link 33 is arranged to be adjustably mounted along the arm 35 whereby the angular turn imposed on the headlights when the arm 35 moves in its plane may be adjustably varied. As particularly shown, the arm 35 is provided with a series of perforations 41 for the reception of the pivot bolt 42 connecting the link 33 thereto, it being obvious, however, that a clamp member providing a pivotal connection for the link 33 and adjustably disposable along the arm 35 might be utilized in lieu of the provision of the perforations 41 and pin 42. Preferably, and as shown, the link 33 is formed in two sections connected by a turn buckle 43 whereby its length may be adjusted as may be necessary to insure a proper relation of the setting of the headlights with respect to that of the steering mechanism.

It is noted that the use of the arm 33 for controlling the position of the headlights eliminates the effect of any lost motion in the steering gear between the arm and wheels and so insures a particularly positive control of the headlights by the steering gear at all times. And it will furthermore now be obvious, that the mounting and control means provided may be readily installed on vehicles of existing structure merely as an attachment therefor and without involving any structural changes in the vehicle.

I claim:

In a mounting for a dirigible headlight of a vehicle, a horizontally disposed support and brace member extending between the two headlights having a cup shaped recess with an aperture at each end thereof, a vertically disposed spindle upon which a headlight is mounted passing through said aperture, an enlarged head portion at the upper end of said spindle and integral therewith having a cup shaped recess opening toward said first named cup shaped recess, anti-friction means disposed in said cup shaped recesses, a crank arm adjustably secured to said spindle below said support and brace member, means for operating said crank arm in order to move said spindle and the headlight supported thereby, an annular collar upon said crank arm extending toward said brace member, a helical compression spring surrounding said spindle and disposed within said collar and anti-friction means disposed between said spring and said brace member against which said spring reacts to provide a shock absorbing mounting for said headlight.

In testimony whereof, I affix my signature.

CARLTON R. PHILLIPS.